United States Patent
Eilts et al.

(10) Patent No.: US 7,231,184 B2
(45) Date of Patent: Jun. 12, 2007

(54) LOW OVERHEAD TRANSMIT CHANNEL ESTIMATION

(75) Inventors: Henry S. Eilts, Plano, TX (US);
Srinath Hosur, Plano, TX (US); David P. Magee, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 509 days.

(21) Appl. No.: 10/730,242

(22) Filed: Dec. 5, 2003

(65) Prior Publication Data

US 2005/0124297 A1    Jun. 9, 2005

(51) Int. Cl.
*H04B 17/00* (2006.01)
(52) U.S. Cl. ............... 455/67.11; 455/66.1; 455/67.13; 455/67.16; 455/115.1; 455/103; 455/78; 370/335; 370/342; 375/219; 375/146
(58) Field of Classification Search ................ 455/561, 455/550.1, 78, 67.11, 67.13, 67.16, 66.1, 455/65, 103; 375/358
See application file for complete search history.

(56) References Cited

U.S. PATENT DOCUMENTS

| | | | | |
|---|---|---|---|---|
| 5,886,993 | A  * | 3/1999  | Ruszczyk et al. | 370/451 |
| 6,219,561 | B1 * | 4/2001  | Raleigh | 455/561 |
| 6,801,788 | B1 * | 10/2004 | Csapo et al. | 455/561 |
| 6,823,001 | B1 * | 11/2004 | Chea | 375/219 |
| 6,954,446 | B2 * | 10/2005 | Kuffner | 370/335 |
| 6,954,486 | B2 * | 10/2005 | Razzell | 375/148 |
| 7,031,419 | B2 * | 4/2006  | Piirainen | 375/358 |
| 7,079,827 | B2 * | 7/2006  | Richards et al. | 455/266 |

* cited by examiner

*Primary Examiner*—Marceau Milord
(74) *Attorney, Agent, or Firm*—Steven A. Shaw; W. James Brady; Frederick J. Telecky, Jr.

(57) ABSTRACT

A transmit channel ($g_{t1}$, h, $g_{r2}$) through which a first wireless communication transceiver is to transmit to a second wireless communication transceiver can be estimated using information indicative of a relationship between the transmit channel and a receive channel ($g_{t2}$, h, $g_{r1}$) through which the first wireless communication transceiver receives communications from the second wireless communication transceiver. The relationship information (35) is combined (37) with further information (31) to produce an estimate of the transmit channel.

22 Claims, 4 Drawing Sheets

LOW OVERHEAD TRANSMIT CHANNEL ESTIMATION

FIELD OF THE INVENTION

The invention relates generally to wireless communications and, more particularly, to transmit channel estimation in wireless communications.

BACKGROUND OF THE INVENTION

For some types of wireless communication systems, it is advantageous or necessary that the transmitter know the channel characteristics prior to transmitting. As an example, consider multiple input multiple output (MIMO) communication systems. In a MIMO system, each station has multiple transceivers. A station is capable of either transmitting multiple signals simultaneously via different antennas, or receiving multiple signals simultaneously via different antennas. In these systems, it maybe advantageous to adjust the powers or other parameters of the different transmitted signals based upon the characteristics of the transmission channels. To do this, the transmitting station must have knowledge of the channels' characteristics.

One way to get this knowledge is to transmit known measurement signals to the receiver, perform channel estimates at the receiver based upon the received signals, and then send the channel estimate information back to the original transmitting station.

This solution is costly in terms of data transmission efficiency. Transmitting the channel estimate back to the originator is an overhead that subtracts from the data transmission time, as is the need to send a known signal to the receiver. In addition, the time delays involved in doing this may make the channel information "stale" or out of date by the time it is obtained at the originator.

It is therefore desirable to reduce the aforementioned overhead associated with conventional transmit channel estimation.

Exemplary embodiments of the present invention can reduce overhead by estimating a relationship between the transmit and receive channels associated with a transceiver, and then estimating the transceiver's transmit channel at any time based on the aforementioned relationship.

DETAILED DESCRIPTION

In some wireless communication systems, for example systems that utilize orthogonal frequency division multiplexing (OFDM), data is transmitted on multiple frequencies, so the data transmission channel actually includes multiple constituent channels, and a channel estimate of the data transmission channel actually includes multiple constituent channel estimates which respectively correspond to the aforementioned multiple constituent channels. The term "channel" as used herein should be understood to comprehend the aforementioned type of channel that includes multiple constituent channels, and the term "channel estimate" as used herein should be understood to comprehend the aforementioned type of channel estimate that includes multiple constituent channel estimates.

Exemplary embodiments of the invention implement a two-step solution for low overhead transmit channel estimation. The first step is a calibration procedure that measures a relationship between the forward (transmit) path channel (e.g., from transceiver 1 to transceiver 2) and the reverse (receive) path channel (e.g., from transceiver 2 to transceiver 1). The second step is to use the relationship obtained from the calibration procedure, together with a channel measurement obtained for the reverse path channel, to compute a forward path channel. The calibration step need only be done once, e.g., prior to transmission of any data. Once this has been done, the forward path channels can be computed based on the calibration step result and current information about the reverse path (receive) channels. This eliminates much of the aforementioned overhead.

In many wireless communications systems, a mechanism is provided in the communication protocol to measure the transmission channel. For example, the wireless local area network (LAN) standard IEEE 802.11a defines a protocol for wireless communications between multiple transceivers using Orthogonal Frequency Division Multiplexing (OFDM). That standard includes a channel measurement transmission with the transmission of the data packets. The measurement of the channel, also called channel estimation, is required for the proper decoding of data at the receiver. In the case of OFDM, the channel is characterized by a set of complex gains at each data transmission frequency (i.e. each OFDM tone). The channel estimate for OFDM is a set of complex numbers, each an estimate of the complex gain of the channel at a given frequency.

Figure 1:
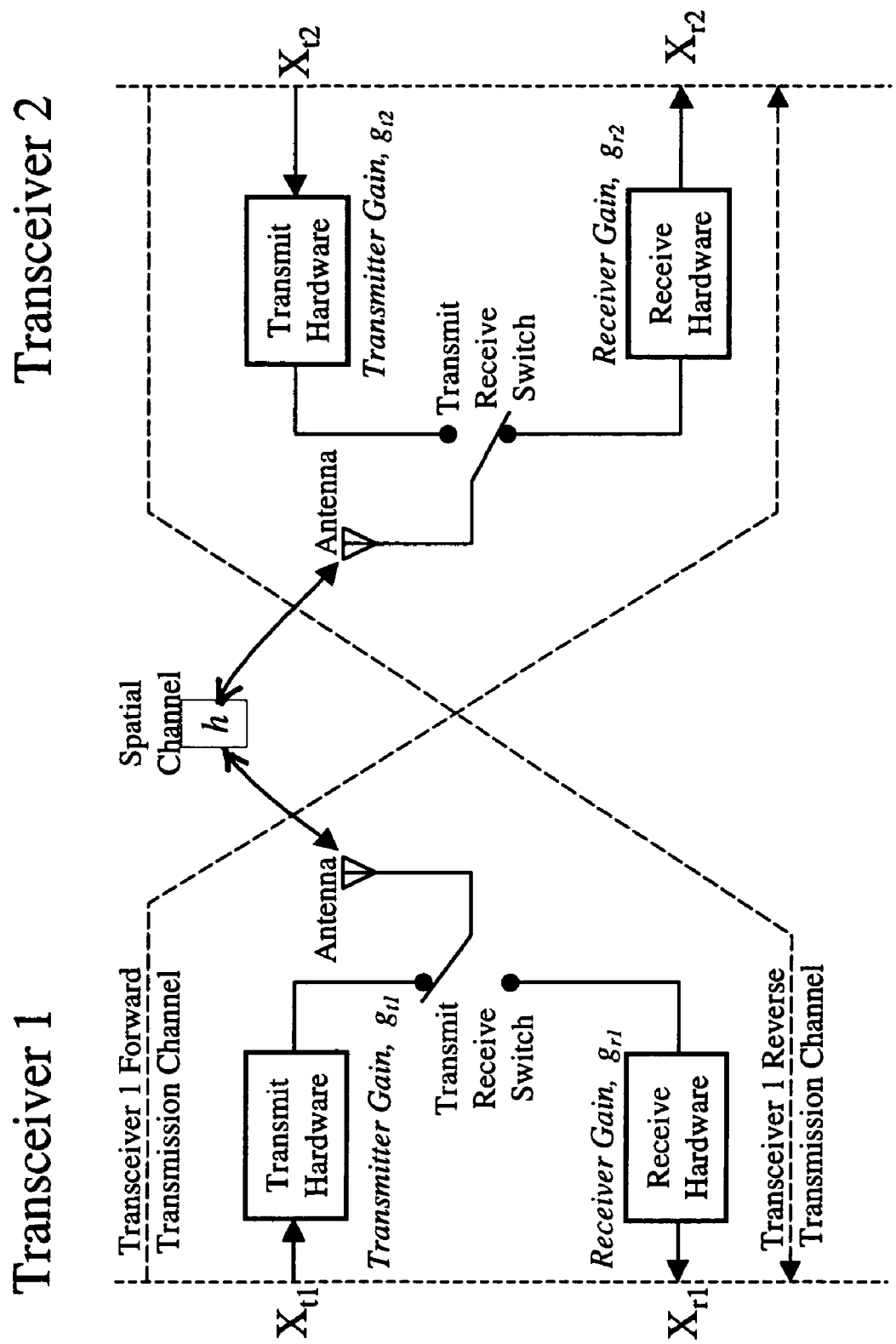
FIG. 1 diagrammatically illustrates exemplary wireless communication systems in which exemplary embodiments of the present invention can be incorporated.

FIG. 1 illustrates the communication scenario between two transceivers. Each transceiver is composed of transmit hardware, receive hardware, a transmit-receive antenna switch, and an antenna. The figure also shows the forward or transmit transmission channel for transceiver 1 and the reverse or receive transmission channel for transceiver 1. The forward channel is the outgoing or transmit channel, whereas the reverse channel is the inbound or receive channel. In the figure, the designation of forward and reverse channels is relative to transceiver 1. Not shown in the figure are the forward and reverse channels for transceiver 2. The forward channel for transceiver 2 is the reverse channel for transceiver 1, and vice-versa. Also, the reverse channel for transceiver 2 is the forward channel for transceiver 1. Exemplary embodiments of this invention convert the reverse path channel estimate into a forward path channel estimate by multiplication of each of the complex gains by correction factors (complex numbers). This is done without further channel estimates or communication between transceiver 1 and transceiver 2, thus reducing overhead and delays.

The channels are mathematically modeled by their complex gain. Transceiver 1 has a forward path channel complex gain given by $$c_{12} = g_{t1} \cdot h \cdot g_{r2},$$

where $c_{12}$ is the forward path complex gain (from transceiver 1 to transceiver 2, designated by the subscript 12), $g_{t1}$ is the transmitter complex gain of transceiver 1, h is the spatial channel gain, and $g_{r2}$ is the receiver complex gain of transceiver 2. The transmit and receiver gains include the relevant portions of the transmit-receive switch and the antenna. Similarly, transceiver 1 has a reverse path complex gain given by $$c_{21} = g_{t2} \cdot h \cdot g_{r1},$$

where $c_{21}$ is the reverse path complex gain (from transceiver 2 to transceiver 1), $g_{t2}$ is the complex gain of transmitter 2, and $g_{r1}$ is the complex gain of receiver 1.

The first step of this invention is a calibration step that reverse channels and computes correction factors. The procedure begins with transceiver 1 sending a channel estimation transmission to transceiver 2. Transceiver 2 receives the transmission and immediately sends a channel estimation transmission back to transceiver 1. This latter transmission is sent promptly to prevent the spatial channel from appreciably changing (decorrelating) during the time between the two transmissions.

Immediately after receiving the channel estimation transmissions, each transceiver computes an estimate of the channel. Specifically, transceiver 1 computes an estimate of $c_{21}$ given by $$\hat{c}_{21} = x_{r1}/x_{t2},$$

where the hat (^) designates an estimate. This is computed from the received signal $x_{r1}$, with the channel estimation transmission $x_{t2}$ known a-priori (i.e. specified in the signaling standard). Similarly, transceiver 2 computes an estimate of $c_{12}$ given by $$\hat{c}_{12} = x_{r2}/x_{t1},$$

with $x_{r2}$ the received signal and $x_{t1}$ a specified transmitted signal.

Transceivers 1 and 2 then exchange channel estimates, so that both transceiver have both $\hat{c}_{12}$ and $\hat{c}_{21}$ available. Transceiver 1 then computes reverse to forward correction factors $f_1$ given by $$f_1 = \hat{c}_{12}/\hat{c}_{21}.$$

To the extent that the estimates are accurate representations of the actual channels, these are approximately $$f_1 \approx \frac{c_{12}}{c_{21}} = \frac{g_{t1} \cdot h \cdot g_{r2}}{g_{t2} \cdot h \cdot g_{r1}} = \frac{g_{t1} \cdot g_{r2}}{g_{t2} \cdot g_{r1}}.$$

Normally the estimates are very good and the approximation is close to exact. Similarly, transceiver 2 computes correction factors $f_2$ given by $$f_2 = \hat{c}_{21}/\hat{c}_{12},$$

which are approximately $$f_2 \approx \frac{g_{t2} \cdot g_{r1}}{g_{t1} \cdot g_{r2}}.$$

The computation of these correction factors completes the calibration step. The correction factors are the information needed to convert a reverse channel estimate into a forward channel estimate. They are stored in the transceiver for use later.

Note that the correction factors f are not functions of the spatial channel h, but instead are functions of the transmitter and receiver gains. These gains are significantly more stable than the spatial channel, in that they remain constant over much longer time intervals. Hence, the calibration procedure needs to be performed much less frequently than the reverse channel estimation procedure, which must be performed often enough to track changes in the spatial channel.

In a second step of this invention, a transceiver converts reverse channel estimates into forward channel estimates by multiplying the reverse channel estimates by the correction factors $f_1$ or $f_2$. For example, if transceiver 1 receives a transmission from transceiver 2, it routinely computes new reverse channel estimates $\hat{c}_{21}$ based upon its received signal. In accordance with this invention, it converts the reverse channel estimates into forward channel estimates by multiplying by $f_1$, via $$\hat{c}_{12} = f_1 \cdot \hat{c}_{21}.$$

This procedure, which multiplies a reverse channel estimate by a complex number, is a much simpler procedure for obtaining an estimate of the forward channel than the alternative procedure that consists of sending a channel estimation transmission to transceiver 2 and then having transceiver 2 send the channel estimates back to the originating transceiver. A second advantage of this procedure is that it is faster than the alternative procedure also, and so provides an estimate with less latency than the alternative. A third advantage is that it eliminates the overhead transmissions of the alternative procedure, and thus increases the data transmission efficiency of the entire system.

In many cases, the availability of the correction factors will eliminate the need for overhead transmissions for the purpose of measuring and communicating the transmit channel. However, it is possible that a transceiver may have data to transmit to another transceiver but has not received any data transmissions from the target transceiver and hence has not computed a recent receive channel estimate. In these cases, the transmitting transceiver can ask the target receive transceiver to send a data packet upon which it can compute the receive channel estimate. In computer jargon, it pings the target transceiver. Even in these cases, the execution of the ping is much quicker that asking the receiver to compute a channel estimate and transmit the results.

Figure 2:
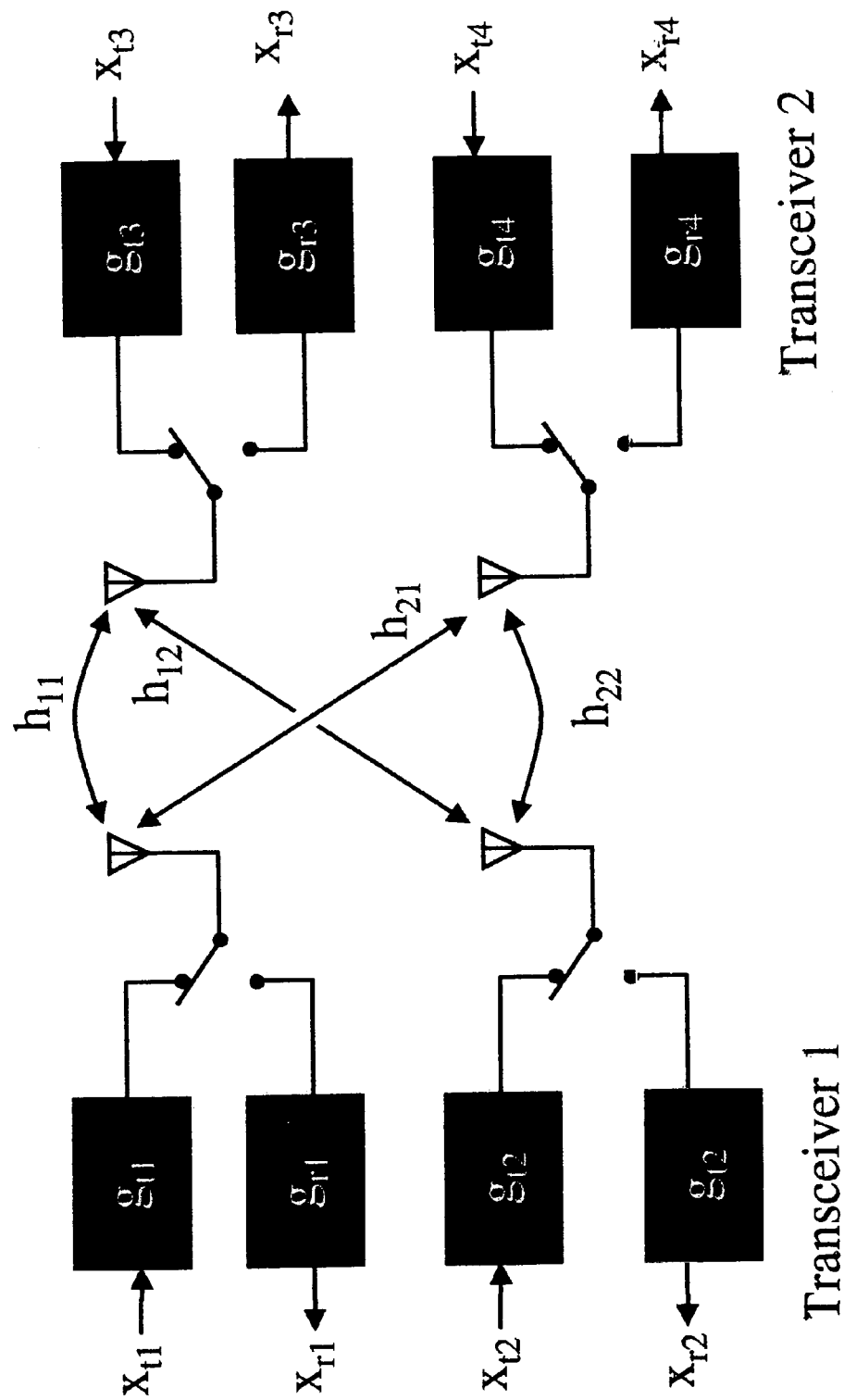
FIG. 2 diagrammatically illustrates exemplary MIMO wireless communication systems in which exemplary embodiments of the present invention can be incorporated.

In some systems, power adjustments to the transmit chains are made based upon the characteristics of the transmit channels. In the case of a multiple input multiple output (MIMO) system, there are multiple channels in operation simultaneously. For that case, multiple calibrations and multiple correction factors will be needed. The calibration operation will be the same in the MIMO case, but will be performed multiple times, once for each forward/reverse channel pair. For example, a MIMO system with 2 transmitters and 2 receivers in each transceiver is shown in FIG. 2. This MIMO system has 4 forward/reverse channel pairs, so the calibration operation would be done 4 times, computing a total of 8 correction factors (4 at each transceiver).

Figure 3:
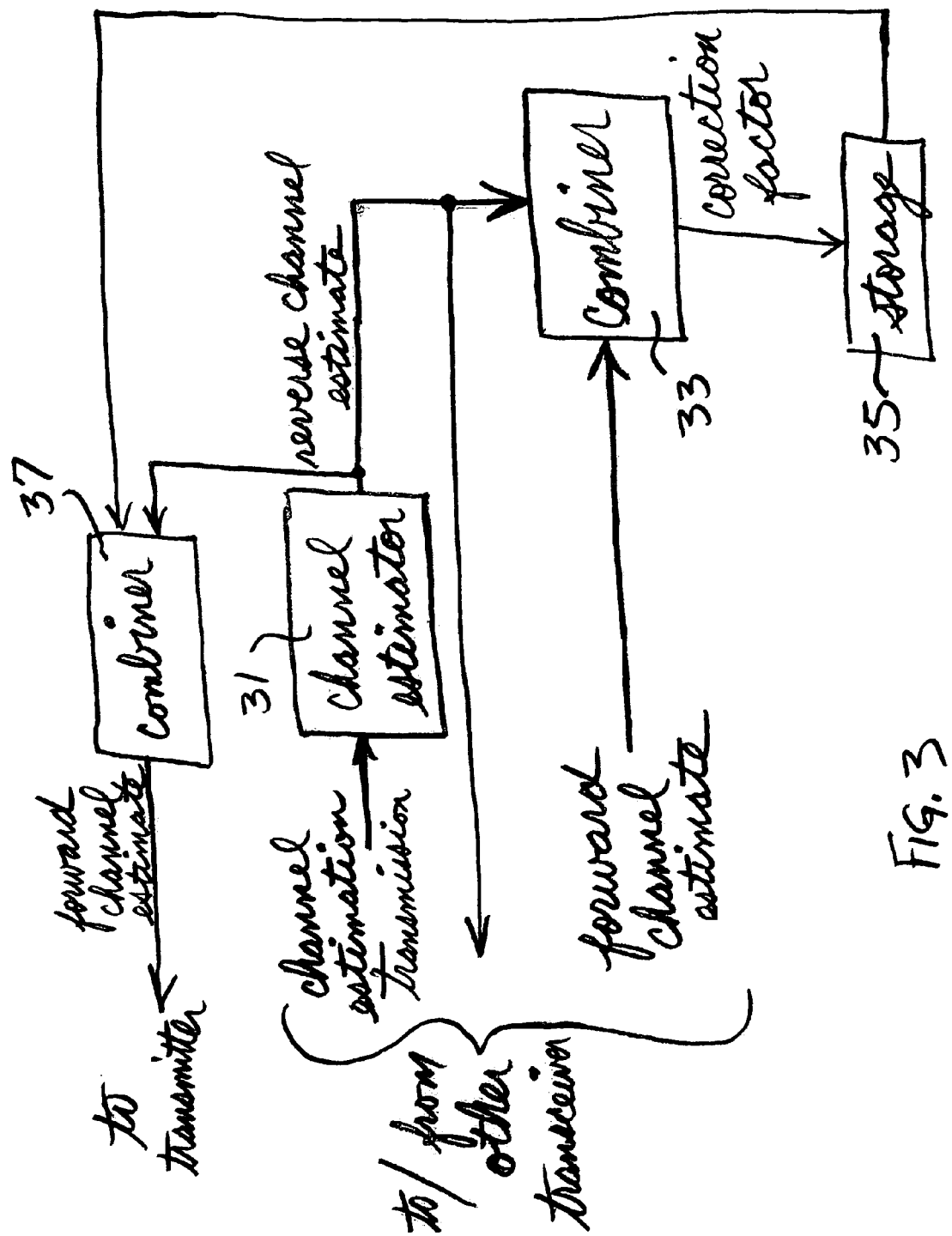
FIG. 3 diagrammatically illustrates exemplary embodiments of a transmit channel estimation apparatus according to the invention.

FIG. 3 diagrammatically illustrates exemplary embodiments of a transmit channel estimator apparatus according to the invention. The apparatus of FIG. 3 can be provided in conjunction with, for example, any of the transceivers described above with respect to FIGS. 1 and 2. As shown in FIG. 3, a channel estimation transmission received from another transceiver in another wireless communication station is input to a channel estimator 31. The channel estimator 31 can apply conventional techniques to the channel estimation transmission to produce a reverse channel estimate. This reverse channel estimate is input to a combiner 33. The combiner 33 combines the reverse channel estimate with a forward channel estimate received from the other transceiver to produce the correction factor, which can be stored in a storage device 35. The reverse channel estimate is also provided to the other transceiver, and will serve as the forward channel estimate input to the combiner 33 in the transmit channel estimator of the other transceiver. When a current forward channel estimate is desired, for example at the time of a desired transmission, the most recent reverse channel estimate can be combined at 37 with the stored correction factor from storage device 35, thereby to produce the desired forward channel estimate for the transmitter.

Figure 4:
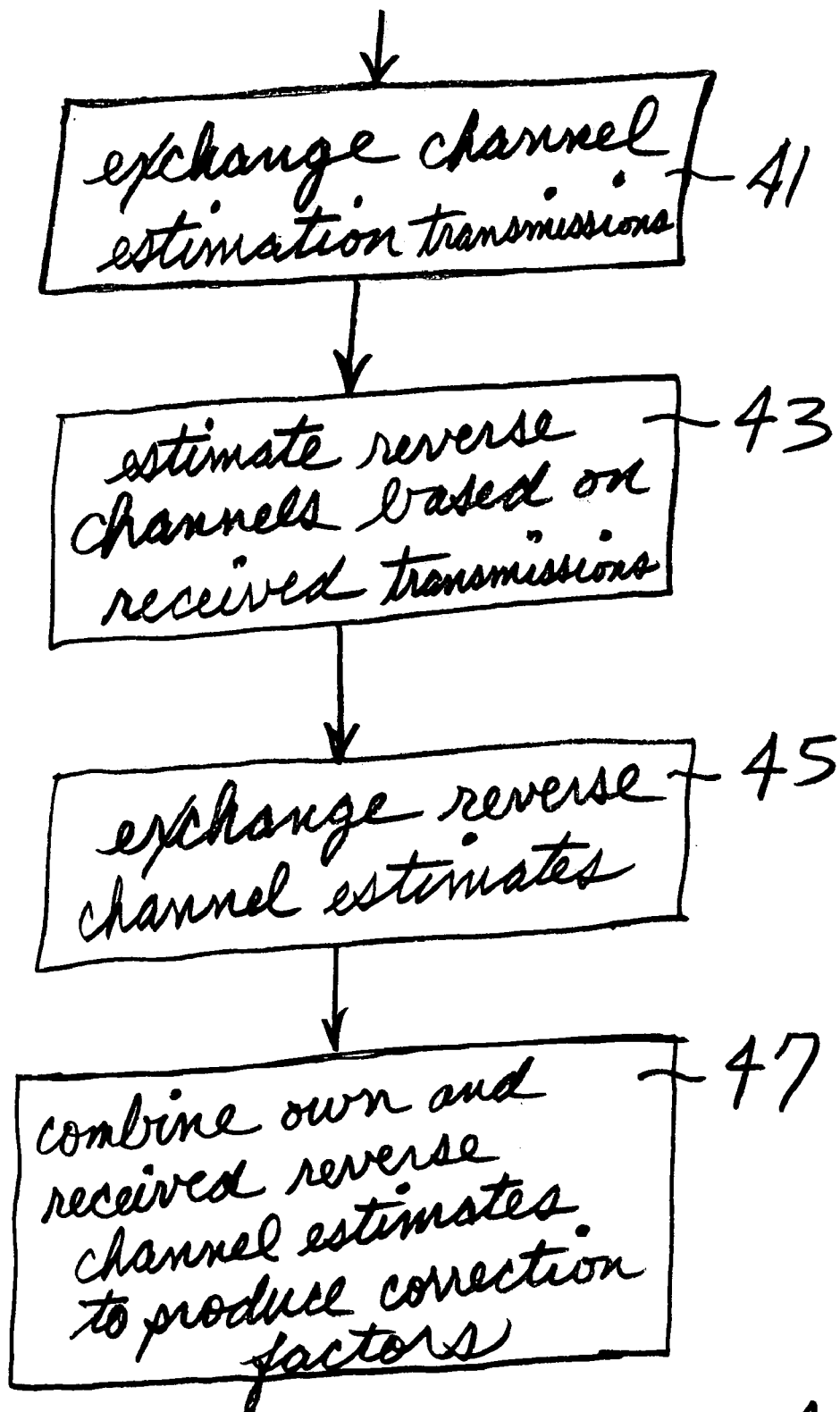
FIG. 4 illustrates exemplary calibration operations which can be performed by transmit channel estimators such as illustrated in FIG. 3.

FIG. 4 illustrates exemplary operations which can be performed by cooperating transmit channel estimators provided in transceivers on opposite ends of the wireless communication links of FIGS. 1 and 2. At 41, the transceivers exchange channel estimation transmissions. At 43, each transmit channel estimator estimates its own reverse channel based on the channel estimation transmission that it received at 41. At 45, the transmit channel estimators exchange their respective reverse channel estimates with one another, thereby providing each other with forward channel estimates. At 47, each transmit channel estimator combines its own reverse channel estimate with the forward channel estimate that it received from the other transmit channel estimator, thereby to produce its correction factor.

Although exemplary embodiments of the invention are described above in detail, this does not limit the scope of the invention, which can be practiced in a variety of embodiments.

What is claimed is:

1. A method of estimating a transmit channel having a transmit chain through which a first wireless communication transceiver having transceiver hardware is to transmit to a second wireless communication transceiver having transceiver hardware, comprising:
providing information indicative of a relationship between said transmit channel and a receive channel including the transceiver hardware through which the first wireless communication transceiver receives communications from the second wireless communication transceiver; and combining said relationship information with further information to produce an estimate of said transmit channel including the transmit chain.

2. The method of claim 1, wherein said further information includes an estimate of said receive channel including the hardware.

3. The method of claim 1, wherein said providing step includes combining a further estimate of said transmit channel with an estimate of said receive channel to produce said relationship information.

4. The method of claim 3, wherein said last-mentioned combining step includes representing said further transmit channel estimate and said receive channel estimate as first and second quantities, respectively, and determining a ratio of said first quantity to said second quantity, said relationship information including said ratio.

5. The method of claim 4, wherein said further information includes a further estimate of said receive channel represented as a third quantity, said first-mentioned combining step including multiplying said ratio by said third quantity.

6. The method of claim 1, including dynamically updating said further information at a plurality of points in time, repeating said combining step for each said update of said further information, and maintaining said relationship information static during each said repetition of said combining step.

7. The method of claim 6, wherein said further information includes an estimate of said receive channel.

8. The method of claim 6, wherein said providing step includes combining a further estimate of said transmit channel with an estimate of said receive channel to produce said relationship information.

9. The method of claim 1, wherein said providing step includes the first wireless communication transceiver transmitting a first communication to the second wireless communication transceiver, and the second wireless communication transceiver transmitting a second communication to the first wireless communication transceiver in response to its receipt of the first communication.

10. The method of claim 9, wherein said providing step includes using the second communication to estimate said receive channel and using the first communication to estimate a further receive channel through which the first communication was received at the second wireless communication transceiver.

11. The method of claim 10, wherein said providing step includes combining said estimate of said receive channel with said estimate of said further receive channel to produce said relationship information.

12. The method of claim 9, wherein said second wireless communication transceiver transmitting step includes the second wireless communication transceiver transmitting said second communication immediately in response to its receipt of the first communication.

13. A wireless communication apparatus, comprising:
an antenna;
a transmitter with transmit hardware coupled to said antenna;
a receiver with receiver hardware coupled to said antenna; and
a transmit channel estimator coupled to said transmitter and said receiver for estimating a transmit channel through which said transmitter is to transmit to a further wireless communication apparatus, said transmit channel estimator including an input for receiving information indicative of a relationship between said transmit channel and a receive channel through which said receiver receives communications from the further wireless communication apparatus, and said transmit channel estimator including a combiner coupled to said input for combining said relationship information with further information to produce an estimate of said transmit channel, wherein the channels include the respective hardware.

14. The apparatus of claim 13, provided as a Multiple Input Multiple Output (MIMO) apparatus and wherein a plurality of constituent channel estimates are produce for a plurality of transmit channels.

15. The apparatus of claim 13, wherein said further information includes an estimate of said receive channel.

16. An apparatus for estimating a transmit channel through which a first wireless communication transceiver is to transmit to a second wireless communication transceiver, comprising:

an input for receiving information indicative of a relationship between said transmit channel and a receive channel through which the first wireless communication transceiver receives communications from the second wireless communication transceiver; and a combiner coupled to said input for combining said relationship information with further information to produce an estimate of said transmit channel.

17. The apparatus of claim 16, wherein said further information includes an estimate of said receive channel.

18. The apparatus of claim 16, including a further combiner having an input for receiving a further estimate of said transmit channel and for receiving an estimate of said receive channel, said further combiner for combining said further estimate of said transmit channel with said estimate of said receive channel to produce said relationship information.

19. The apparatus of claim 18, wherein said further combiner uses first and second quantities to represent said further transmit channel estimate and said receive channel estimate, respectively, and wherein said further combiner is for determining a ratio of said first quantity to said second quantity, said relationship information including said ratio.

20. The apparatus of claim 19, wherein said further information includes a further estimate of said receive channel represented as a third quantity, said first mentioned combiner for multiplying said ratio by said third quantity.

21. A wireless communication apparatus, comprising:

a plurality of forward and reverse channel pairs having transmit and receive chains each with a transceiver comprising at least:

transmit hardware;

receive hardware;

a transmit-receive antenna switch; and at least one antenna;

means for producing a plurality of channel estimates; and means for providing a plurality of correction factors which are functions of at least a gain of the transmit hardware and a gain of the receive hardware.

22. The apparatus of claim 21, provided as a Multiple Input Multiple Output (MIMO) apparatus.

* * * * *